United States Patent
Haake et al.

(10) Patent No.: US 9,587,762 B2
(45) Date of Patent: Mar. 7, 2017

(54) TORQUE SUPPORT FOR A VALVE LOCK

(76) Inventors: André Werner Haake, Stadtlohn (DE);
Patrick Philipp Haake, Vreden (DE);
Oliver Henri Haake, Stadtlohn (DE)

(*) Notice: Subject to any disclaimer, the term of this patent is extended or adjusted under 35 U.S.C. 154(b) by 510 days.

(21) Appl. No.: 13/375,867

(22) PCT Filed: May 29, 2010

(86) PCT No.: PCT/DE2010/000604
§ 371 (c)(1),
(2), (4) Date: Mar. 2, 2012

(87) PCT Pub. No.: WO2010/139302
PCT Pub. Date: Dec. 9, 2010

(65) Prior Publication Data
US 2012/0153196 A1  Jun. 21, 2012

(30) Foreign Application Priority Data
Jun. 4, 2009  (DE) .................... 09007371

(51) Int. Cl.
*F16K 35/00* (2006.01)
*F16K 35/10* (2006.01)
*F16K 35/06* (2006.01)

(52) U.S. Cl.
CPC ............. *F16K 35/10* (2013.01); *F16K 35/06* (2013.01)

(58) Field of Classification Search
CPC .... F16K 35/10; F16K 35/06; Y10T 137/7256; Y10T 70/5624; Y10T 70/5779
USPC ............... 137/383, 384.2, 384.4, 384.8, 385; 70/175–181, 184, 186, 187, 207, 211, 70/213, 215, 224; 251/90–93, 95–102
See application file for complete search history.

(56) References Cited

U.S. PATENT DOCUMENTS

| | | | | |
|---|---|---|---|---|
| 178,709 A * | 6/1876 | Barker | .......................... | 411/120 |
| 853,168 A * | 5/1907 | Garbe | .......................... | 137/385 |
| 1,262,656 A * | 4/1918 | Fisher | .............................. | 70/211 |
| 1,363,225 A * | 12/1920 | Boggs | ............................. | 70/180 |
| 1,550,487 A * | 8/1925 | Barnes | ........................... | 70/177 |
| 4,460,153 A * | 7/1984 | Williams | ........................ | 251/99 |
| 5,598,724 A * | 2/1997 | Primeau | .......................... | 70/177 |
| 5,806,555 A * | 9/1998 | Magno, Jr. | .................... | 137/385 |
| 6,152,161 A | 11/2000 | Yokota et al. | | |

(Continued)

FOREIGN PATENT DOCUMENTS

| | | |
|---|---|---|
| EP | 0 942 215 A1 | 9/1999 |
| GB | 558263 A | 12/1943 |
| WO | WO 2009/026905 A1 | 3/2009 |

OTHER PUBLICATIONS

International Search Report for corresponding International Patent Application No. PCT/DE2010/000604 mailed Aug. 6, 2010.

*Primary Examiner* — Mary McManmon
*Assistant Examiner* — Hailey K Do
(74) *Attorney, Agent, or Firm* — Patricia Mathers; Jeffrey Joyce

(57) ABSTRACT

The invention relates to a torque support for a valve lock (5) in order to prevent a rotation of the lock with respect to the valve (1), wherein a connection housing (8) adjoins the valve lock and at least one boom (9, 9a) carried by the connection housing rests against the valve housing in the pivoted-out end position. Similarly, the torque support can also be connected to the valve housing and the boom can rest against the connection housing, or the connection housing is integrated in the valve lock.

20 Claims, 4 Drawing Sheets

(56) References Cited

U.S. PATENT DOCUMENTS

2004/0200320 A1* 10/2004 Knopp et al. ............... 81/57.39

* cited by examiner

TORQUE SUPPORT FOR A VALVE LOCK

BACKGROUND INFORMATION

Field of the Invention

The invention relates to a torque support for a valve lock in order to prevent a rotation of the lock with respect to the valve.

Discussion of the Prior Art

Valve lock systems perform the task of preventing the valve from being actuated in an unauthorized manner to prevent an unauthorized change to the state of the valve.

These locking systems are therefore inserted as a separate component between the valve and the valve actuator, wherein this separate component substantially comprises or impinges on the interfacing means between the valve actuator, e.g. a hand wheel or a hand lever, and the valve stem.

Valve locking systems or respectively the torque supports thereof and adapters for manually operated valves are required for adapting to the wide range of valves in various designs which are being used. Adapters of the locking systems have to be adapted to the different stem shapes. The normal case is one where the end position can be set in said locking systems. The positions "valve completely open" and "valve completely closed" are frequently selected as the end position, wherein however other valve positions are also possible.

The interface between the valve stem and the actual lock of the locking system occurs, e.g., thereby via a hollow shaft, on the outside of which teeth for a retaining pawl are situated and in the end regions of which receptacles for adapters are located, which on the one hand are used to connect the stem and on the other hand are used to connect the hand wheel or the actuating lever.

Valve locking systems are also used everywhere, where an operational sequence for the valves contributes to an increase in personal and facility safety. Such facilities frequently include off shore oil rigs, chemical plants and oil refineries, those of the gas industry, as well as nuclear power plants.

A torque support generally serves the purpose of preventing a rotation of the valve lock with respect to the valve. This is also important for the reason of securing the end-position setting of said valve lock. In the locked state, the torque support must intercept the torque during an unauthorized attempt to actuate the valve so that the entire lock on the valve cannot be rotated.

European patent publication EP 0 942 215 discloses a device that is a robust, heavy web. Said web is fixed to the valve lock overlaps the hand wheel and mounts to two brackets beneath said hand wheel, which encompass the valve or respectively the valve housing thereof like a clamp. These two clamps are screwed to one another and have to be adapted to the valve housing or the valve lever. This version is complicated to install and destroys the design of the lock per se.

WIPO patent publication WO 2009/026 905 A1, in which an adapter ring for connecting the torque support to the valve lock and two arresting rings that are located inside the adapter ring are provided, each arresting ring carrying a thrust bearing plate that extends downward. The thrust bearing plates only extend over part of the circumference of the arresting rings and can thus overlap either the pipe containing the valve slide or the sealing means or corresponding devices on the valve housing, by which the rotation of the valve lock is prevented. A plurality of locking screws is necessary and provided in said adapter ring for rotationally fixing the arresting rings. This arrangement is individually adapted to each valve design and can therefore not be manufactured in a prefabricated manner and requires a plurality of components comprising screws, tools and the like for installation.

U.S. Pat. No. 5,806,555 discloses a locking device for valves, which is not comparable with the locking system according to the European patent publication EP 0 942 215 A1 that can be actuated with a key. In this known apparatus, the lever actuating the valve slide is fixed in both end positions thereof, i.e., in the completely open position or in the completely closed position, by means of two overlapping brackets, which can be connected to one another and secured via padlocks. This system is only operational if the two padlocks are taken off, the two brackets are removed and the actuating lever for the valve slide is actuated. In this case, a connection therefore does not exist between the valve stem and the actual lock of the locking system, but rather the locking system referenced here must be completely dismantled if the actuating lever is to be operated. In these arrangements, it is not ensured that only a fixed operational sequence of the different valves to be actuated can be executed.

Valve locking systems normally work, as can be seen in the European patent publication EP 0 942 215 A1, with a plurality of locks and keys and the valve locks can only be actuated if both keys are in the lock. The keys are thereby individually coded.

A key having incorrect coding cannot be inserted into the lock or rather cannot release said lock. The respective keys can only be withdrawn if the valve is located in a certain position. If one key is withdrawn, the other key is then caught in the lock. It is usually the case that the key can only be withdrawn if the valve is completely open, and the other key can only be removed if the valve is completely closed. The arrangement known from the American patent publication U.S. Pat. No. 5,806,55 does not fulfill this requirement.

What is needed, therefore, is a torque support that results in low assembly costs, facilitates cost-effective production, and is able to be used with different valve types.

BRIEF SUMMARY OF THE INVENTION

The invention is a torque support device for a valve lock that comprises a connection housing that adjoins or is arranged in the valve lock and at least one extension arm. The extension arm is pivotably mounted on the connection housing and and may be swung against the valve housing, whereby a blocking mechanism prevents the extension arm from swinging away from the valve housing.

Similarly, it is also possible that the connection housing be connected to the valve housing and that the extension arm be placed against the valve lock when in use.

According to the invention, the pivoting motion of the extension arm is pre-biased to connect to the connection housing, whereby, when being placed in use, a blocking mechanism is provided that allows the extension arm to pivot in one direction only. The extension arm lies against uneven surfaces of the valve housing or extends across the pipe that is fitted on the valve, either on one side or on both sides, or, when the connection housing is installed on the valve housing, the extension arm lies against an oval or polygonal valve lock. This arrangement of the extension arm ensures that the valve lock cannot rotate with respect to the valve housing.

Various embodiments of the blocking mechanism are possible. In one embodiment, the blocking mechanism may comprise spring loaded discs that are constructed as toothed lock washers that are provided on the extension arm and on a compression element. In another embodiment, the blocking mechanism may be a ratchet assembly, which allows movement in one direction and blocks movement in the opposite direction.

According to one exemplary embodiment of the invention, the extension arm, i.e., the bearing for the extension arm, has one or more boreholes and the connection housing has one or more blocking discs that correspond to the head section of the bearing component. Boreholes are likewise provided in the blocking discs. The boreholes may also lie on different pitch circle diameters and are intended to receive pins, which now fixedly connect the extension arm to the connection housing. The extension arm is brought into the lock position and the pins then inserted to fix the extension arm in place. The different pitch dimensions for the boreholes provide the ability for fine adjustment of the lock position.

Spacer elements are provided at the ends of the extension arm or arms. These spacers compensate for small diameter differences in the valve housing and may be push-fit onto the extension arm. They may also be mounted eccentrically on the end of the extension arms and in so doing bridge certain clearance differences.

The extension arm itself may be constructed as a single-piece component or as a multiple-piece component.

It is also possible, that tensioning bands be provided on the extension arms, so that, when connected to the connection housing, the extension arms are additionally fixed by the tensioning bands.

The blocking mechanism is preferably provided in the connection housing and safely positioned there against manipulation, i.e., access to the blocking mechanism is only possible with the use of certain special tools. The blocking mechanism may also be riveted, to ensure that access to the locking device is prevented. Access is then only possible by destroying the mechanism.

BRIEF DESCRIPTION OF THE DRAWINGS

Exemplary embodiments of the invention are explained below with the aid of the drawings.

DETAILED DESCRIPTION OF THE INVENTION

Figure 1:
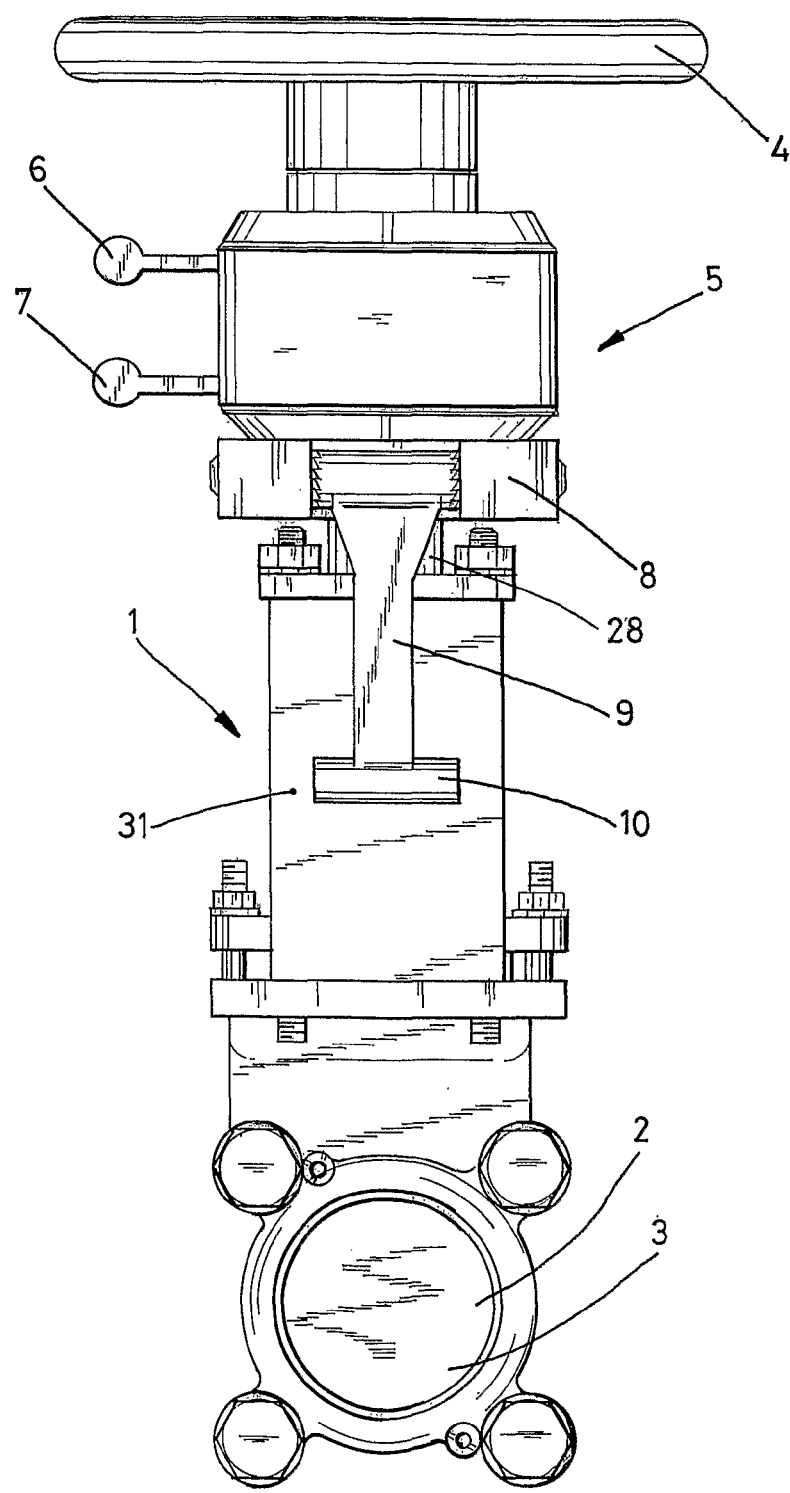
FIG. 1 illustrates a valve arrangement, showing the valve and valve lock with the connection housing according to the invention assembled between the valve housing and valve lock and the extension arm placed against the valve housing.

FIG. 1 illustrates a valve 1 inserted into a pipe 2. A valve slide 3 that closes the pipe 2 is also shown in this figure. The valve slide 3 is connected via a gear assembly 28 to a valve-actuating element, in this case, a hand wheel 4. The valve slide 3 is actuatable via the hand wheel 4. A valve lock 5 is provided intermediate the gear assembly 28 and the hand wheel 4. The valve lock 5 facilitates or prevents in a conventional manner actuation of the actual valve 1 via the keys 6 and 7.

A torque support device 100 according to the invention is shown inserted into the valve assembly between the valve lock 5 and the gear assembly 28. The torque support comprises a connector housing 8, an extension arm 9 that has a first end that is pivotably mounted on the connector housing 8 and is assembled in the valve assembly in a torque-proof manner, and a second end that is pivotable between a lock position and an unlock position. Pivoting the extension arm 9 into the lock position prevents a rotation of the valve lock 5 relative to the valve 1. A blocking mechanism 11, 14, or 32, described below, is provided, to prevent the arm 9 from pivoting back to the unlock position.

The valve 1 has a housing 31 with a polygonal wall and, in the lock position, the extension arm 9 lies against this polygonal wall. A spacer element 10 may be provided between the end of the extension arm 9 and the wall. An identical extension arm 9 may, of course, be provided on the back side of the actual valve 1 that is shown in FIG. 1.

Figure 2:
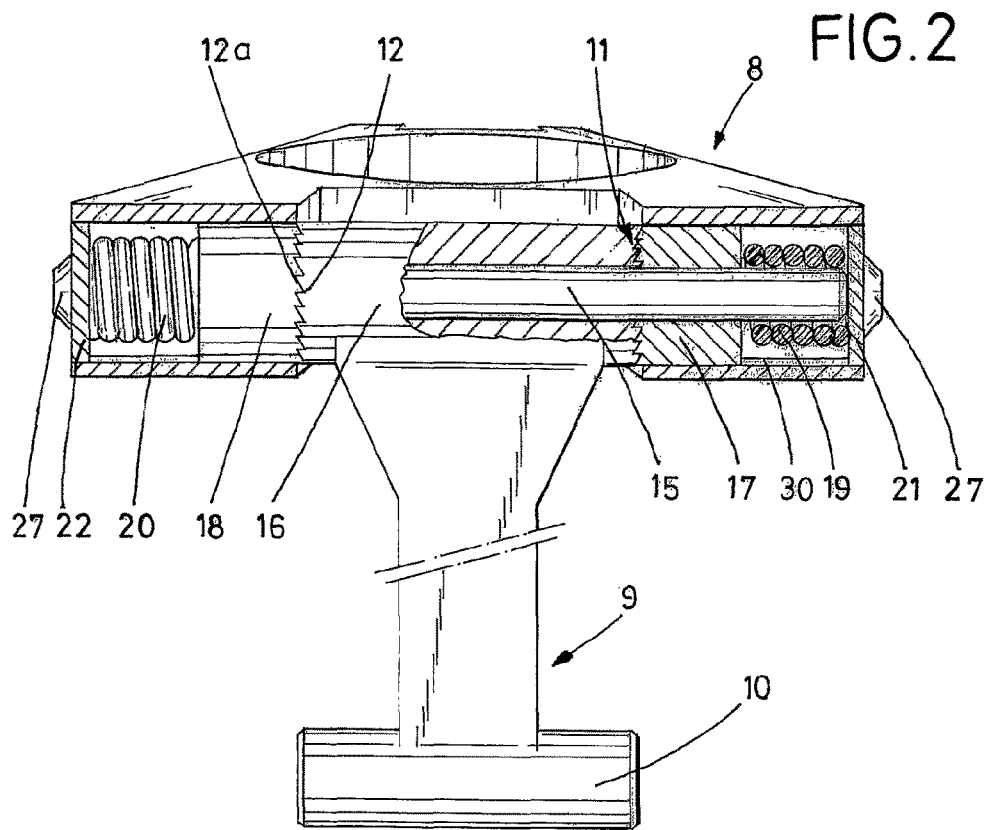
FIG. 2 illustrates in larger scale how the extension arm is mounted in the connection housing and also the first embodiment of the blocking mechanism, shown in the blocking position.

FIG. 2 illustrates with greater detail how the extension arm 9 is mounted in the connector housing 8 and also illustrates a first embodiment of the blocking mechanism 11. The housing 8 encloses a shaft 15 that passes through a bearing 16. End caps 21 and 22 are provided at the end faces of the housing 8 to close the opening for the shaft 15. The end faces of the bearing 16 have teeth 12. Compression elements 17 and 18 are also mounted on the shaft 15, so as to be displaceable in the axial direction of the shaft. These compression elements also have teeth 12a. The compression elements 17 and 18 are mounted in a tongue-and-groove configuration 30 in the connection housing 8, so as to be torque-proof. One end of these compression elements 17 and 18 presses up against the inside of the respective end cap 21 and 22, and the other end is forced against the teeth 12 of the bearing 16 by springs 19 and 20.

This first blocking mechanism 11 restricts a pivoting motion of the extension arm or arms 9 to one direction only. The pivoting motion is in the direction toward the valve housing 31, whereas a pivoting motion in the opposite direction is prevented by the meshed teeth 12 and 12a. In addition, the meshed teeth 12 and 12a, that is to say, these tooth lock washers, cause the extension arm 9 to be placed against the valve housing under a certain preload. The spacer elements 10 may be used to compensate for certain clearances that may occur, and particularly, the spacers 10 may be eccentrically mounted. The end caps 21 and 22 are fixed in a tamper-proof manner in the connection housing 8 by a protective end cap 27, so that an unwanted manipulation of the torque support device is not possible.

Figure 3:
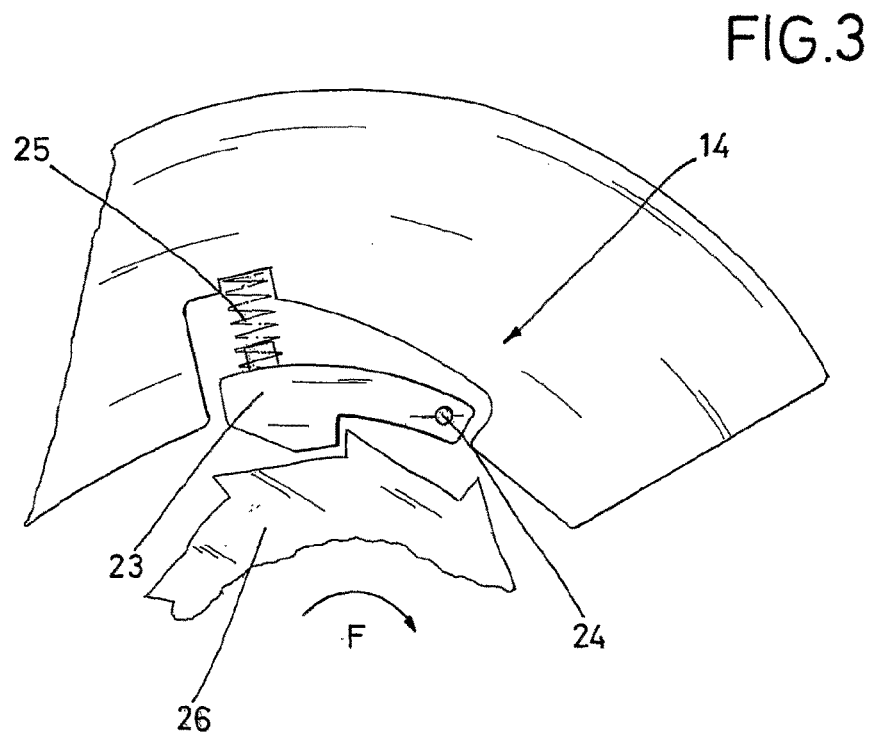
FIG. 3 illustrates the second embodiment of the blocking mechanism, a ratchet assembly, shown in the blocking position.

FIG. 3 illustrates details of the second embodiment of a blocking mechanism 14, a ratchet assembly that includes a ratchet or gear wheel 26 and a pawl 23. The pawl 23 is pivotably mounted at a pivot point 24 and is biased against the ratchet wheel 26 by a return spring 25. The pawl 23 interacts with the ratchet wheel 26 in a conventional manner, i.e., the pawl 23 allows the ratchet wheel 26 to rotate in one direction only and in discrete increments. The pawl 23 has an angled contact face and, when the ratchet wheel 26 moves in the direction of arrow F, the tooth of the ratchet wheel 26 slides along the angled face 23, which lifts the pawl 23 against the force of the spring 25. In the case of a backward movement, i.e., a rotation against the direction of arrow F, the tooth of the ratchet wheel 26 makes contact against a corresponding projection of the pawl 23, which prevents a rotation in the opposite direction. The ratchet wheel 26 may be provided on the bearing 16 of the extension arm 9 and the component that has the pawl 23 may be connected to the connection housing component 8.

Figure 4:
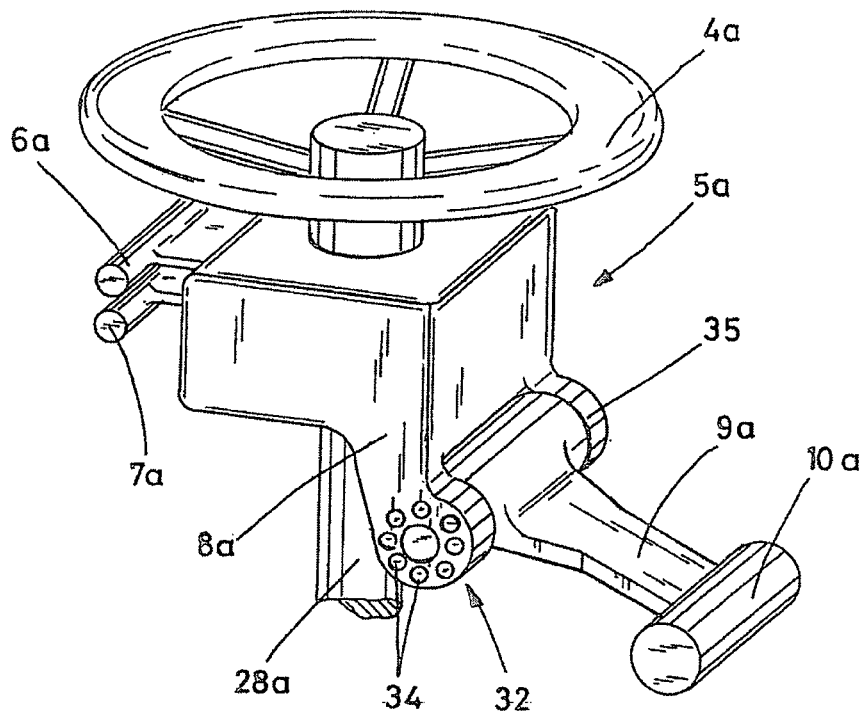
FIG. 4 illustrates the third embodiment of the blocking mechanism, an arrangement of a blocking disc with fasteners, and also shows the connection housing integrated into the valve lock.
Figure 5:
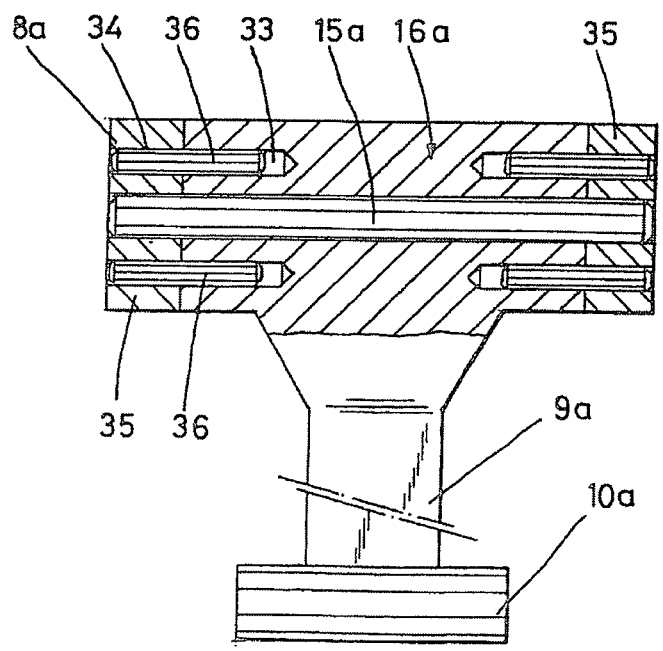
FIG. 5 is a cross-sectional illustration of the embodiment in FIG. 4, similar in view to FIG. 2.

FIGS. 4 and 5 illustrate a third embodiment of the blocking mechanism 32 to secure the extension arm 9 in the desired lock position. Components that correspond to components in the first two embodiments have the same reference numerals, but with the additional letter "a", for example, a valve lock 5*a* with keys 6*a* and 7*a*. Blocking discs 35 are mounted on the end faces of the bearing 16*a*. Bore holes 34 that coincide or are algined with the bore holes on the blocking discs are provided in the blocking discs 35 and the end faces of the bearing 16*a*. Fasteners 36, such as pins or screws, rivets or the like are inserted into these coinciding boreholes, so as to secure the extension arm 9*a* in the desired lock position. The bore holes 34 shown in FIG. 4 are placed on the same pitch circle diameter, but it is understood, that the bore holes may also be provided on different pitch circle diameters. The different pitch circle diameters allow for a fine adjustment of the position of the extension arm 9*a*. The shaft 15, shown in FIG. 2 and which is denoted in this embodiment as shaft 15*a*, thereby passes through the bearing 16*a* and the blocking discs 35.

The torque support according to the invention represents a more cost-effective solution than the individually adapted torque supports from prior art. The torque support disclosed herein may be individually adapted to the most varied valve sizes and valve forms. Assembly and production costs are lower for the torque support according to the invention and the device is very stable depending on the design.

The extension arm 9, 9*a* is shown herein as a single-piece component, but it is understood, that the arm may be constructed of a plurality of components, so as to facilitate adaptation of the arm to different valve forms.

Figure 6:
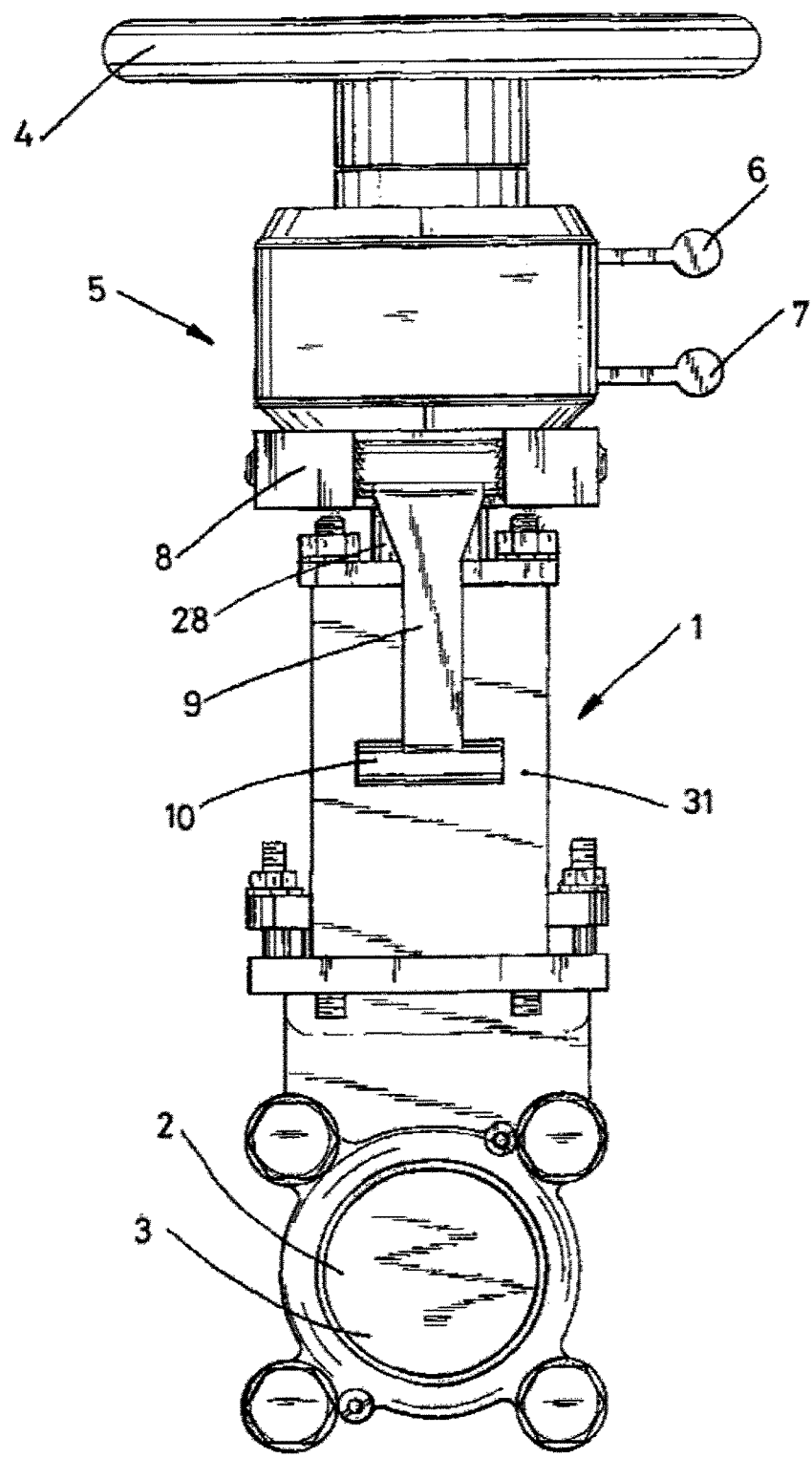
FIG. 6 illustrates a rear view of the valve arrangement shown in FIG. 1, showing an extension arm on the rear side of the arrangement.

FIG. 6 illustrates the rear face of the valve 1 with a second extension arm 9 that extends from the connector housing 8.

The invention claimed is:

1. A torque support for use on a valve that has a key-operated valve locking device, the valve comprising a valve assembly that includes at least a valve housing and a valve lock, the torque support comprising:
   a connection housing mounted in the valve assembly intermediate the valve lock and the valve housing, the connection housing having a head section;
   an extension arm that has a first end that is pivotably mounted on the head section of the connection housing and a second end that is movable between a lock position and an unlock position; and
   a blocking mechanism that includes at least one pair of spring-loaded locking discs with teeth that mesh with each other;
   wherein the blocking mechanism interacts with the pivotable mounting of the extension arm, so as to allow the extension arm to pivot only in a direction toward the lock position and prevent pivoting of the extension arm toward the unlock position; and
   wherein the unlock position of the extension arm allows rotation of the valve lock relative the valve and the lock position that prevents rotation of the valve lock relative the valve.

2. The torque support of claim 1, wherein the extension arm is mounted on a shaft that extends across the head section and the blocking mechanism is mounted on the shaft.

3. The torque support of claim 1, wherein the extension arm is mounted on a shaft that extends through the head section and the blocking mechanism is mounted on the ends of the shaft outside the housing.

4. The torque support of claim 1, wherein the connection housing is integrated into the valve lock.

5. The torque support of claim 1, wherein the connection housing is integrated into the valve housing.

6. The torque support of claim 1, wherein the extension arm includes a first extension arm mounted on a first face of the connection housing and a second extension arm mounted on an opposing face of the extension housing.

7. The torque support of claim 1, wherein a spacer element is provided on the second end of the extension arm.

8. The torque support of claim 7, wherein the spacer element is pushed onto the extension arm.

9. The torque support of claim 7, wherein the spacer element is mounted on a bearing that is eccentrically mounted on the extension arm.

10. A torque support for use on a valve that has a key-operated valve locking device, the valve comprising a valve assembly that includes at least a valve housing and a valve lock, the torque support comprising:
    a connection housing mounted in the valve assembly intermediate the valve lock and the valve housing, the connection housing having a head section;
    an extension arm that has a first end that is pivotably mounted on the head section of the connection housing and a second end that is movable between a lock position and an unlock position; and
    a blocking mechanism that is a ratchet assembly that includes a pawl and a ratchet wheel;
    wherein the pawl interacts with the ratchet wheel so as to allow movement of the ratchet wheel in a locking direction only and prevents movement in an opposite direction; and
    wherein the unlock position of the extension arm allows rotation of the valve lock relative the valve and the lock position that prevents rotation of the valve lock relative the valve.

11. The torque support of claim 10, wherein the ratchet assembly is incorporated into the connection housing.

12. The torque support of claim 10, wherein the connection housing is integrated into the valve lock.

13. The torque support of claim 10, wherein the connection housing is integrated into the valve housing.

14. The torque support of claim 10, wherein a spacer element is provided on the second end of the extension arm.

15. The torque support of claim 10, wherein the extension arm includes a first extension arm mounted on a first face of the connection housing and a second extension arm mounted on an opposing face of the extension housing.

16. A torque support for use on a valve that has a key-operated valve locking device, the valve comprising a valve assembly that includes at least a valve housing and a valve lock, the torque support comprising: a connection housing mounted in the valve assembly intermediate the valve lock and the valve housing, the connection housing having a head section;
    an extension arm that has a first end that is pivotably mounted on the head section of the connection housing and a second end that is movable between a lock position and an unlock position; and
    a blocking mechanism that interacts with the pivotable mounting of the extension arm, so as to fix the extension arm in the locked position;

wherein the head section has a first end and a second end, and wherein the blocking mechanism includes an end disc that is assembled on the first and/or second ends of the head section, and wherein one or more bores are provided in different pitch circle diameters in the head section and in the respective end disc and one or fasteners are inserted in the one or more bores, thereby preventing a pivoting motion of the extension arm.

17. The torque support of claim 16, wherein an end cap is assembled on the head section to prevent tampering with the blocking mechanism.

18. The torque support of claim 16, wherein a spacer element is provided on the second end of the extension arm.

19. The torque support of claim 18, wherein the spacer element is pushed onto the extension arm.

20. The torque support of claim 18, wherein the spacer element is mounted on a bearing that is eccentrically mounted on the extension arm.

\* \* \* \* \*